United States Patent
Aziz

[11] Patent Number: 5,907,400
[45] Date of Patent: May 25, 1999

[54] FOLDED LOW-POWER INTERFERENCE MICROSCOPE OBJECTIVE

[75] Inventor: David J. Aziz, Tucson, Ariz.

[73] Assignee: Veeco Corporation, Tucson, Ariz.

[21] Appl. No.: 08/946,303

[22] Filed: Oct. 7, 1997

[51] Int. Cl.⁶ ........................................... G01B 9/02
[52] U.S. Cl. ..................... 356/345; 356/360; 359/370
[58] Field of Search .................... 356/345, 357, 356/359, 360; 359/370, 382, 383, 384

[56] References Cited

U.S. PATENT DOCUMENTS

| | | | |
|---|---|---|---|
| 4,884,880 | 12/1989 | Lictman et al. | 359/227 |
| 4,983,042 | 1/1991 | Korner et al. | 356/359 |

*Primary Examiner*—Samuel A. Turner
*Attorney, Agent, or Firm*—Antonio R. Durando

[57] ABSTRACT

A low-magnification interference microscope objective is rendered parfocal with a high-magnification objective by folding the light beam to the side of the optical axis of the objective, thereby maintaining the original optical path length while shortening the mechanical length of the objective. The beam is reflected by a mirror, causing it to travel some distance out to the side, and then it is reflected back toward the beamsplitter by an additional pair of mirrors. After a final reflection within the beamsplitter, the resulting beam is coaxial with the original optical axis, while the physical length of the objective has been substantially reduced. This approach makes it possible to obtain a desired distance from the mounting shoulder of the objective to the focal point.

23 Claims, 3 Drawing Sheets

FOLDED LOW-POWER INTERFERENCE MICROSCOPE OBJECTIVE

BACKGROUND OF THE INVENTION

1. Field of the Invention

This invention is related in general to the field of interferometry and, in particular, to a novel interference microscope objective with a folded optical path to reduce the physical length of the objective.

2. Description of the Related Art

It is desirable to provide interferometric instruments with the flexibility of operating at different magnifications. Accordingly, interferometers used to measure surface roughness are often equipped with a rotatable turret capable of accommodating multiple interference microscope objectives with different optical power. In such a configuration, it is very important that the objectives be substantially parfocal, as defined below, to minimize the need for focussing after switching from one objective to another.

In surface profilometry applications, interference microscope objectives are typically used with magnifications in the 1.5× to 10× range. Based on current commercial availability, microscope objectives commonly used for these applications are used with a tube lens with a specific reference focal length (for example, typically 200 mm for Nikon, 180 mm for Olympus, and 160 mm for Zeiss objectives). Therefore, the focal length of these objectives varies inversely with their power according to the relation $f_{objective} = f_{Reference}/\text{power}$. For example, a 50× Nikon objective has a focal length of 4 mm; a 20× Nikon objective of 10 mm; and so on. Obviously, low power objectives have a relatively long focal length, which makes it difficult to design them with a physical length sufficiently short to fit alongside high power objectives that may be less than half their length. The problem is further exacerbated by the necessity of introducing a beamsplitter between the objective's lens and the test sample for interference purposes.

In practice, objectives in the 2.5× to 50× range are substantially similar in size and can be mounted coplanarly on a turret such that the distance between their mounting shoulder and their focal point is the same. For the purposes of this disclosure, multiple objectives characterized by this condition are defined as "parfocal" objectives. Referring to the Wyko 2.5× microscope objective 10 shown in FIG. 1, for example, which includes a beamsplitter for interference purposes, the distance D between its mounting shoulder 12, which in operation abuts the mounting plane 14 of the objective turret 16, and its focal point F (shown coincident with a sample surface S) is approximately 48 mm. The corresponding distances for comparable Wyko 5×, 10×, 20× and 50× objectives are about 49, 45, 45 and 45 mm, respectively.

Therefore, these reference objectives are readily rendered parfocal by adding collars of different lengths to each one to provide a common nominal parfocal distance D' to the focal point F. This modification is illustrated in the Wyko 10× objective 20 shown in FIG. 2, also including a beamsplitter for interference purposes, where an extension collar 22 is inserted between the shoulder 12 of the objective and the plane 14 of the turret 16 so as to increase the distance D by about 6.35 mm to a nominal parfocal distance D' of approximately 51.35 mm. Using this approach, all objectives with powers in the range between 2.5× and 50× are modified in a relatively simple manner for parfocal use in a single turret having a mounting plane 14 that produces a substantially focussed condition when the object under test is placed at about the distance D' from the plane 14. Thus, once an object is in focus for one objective, it remains substantially so when the turret 16 is rotated and other objectives are placed in operation.

For the purpose of this disclosure, the focal point F is assumed to be coincident with the location of the sample surface S. This describes the "infinite conjugates" imaging condition, in which the objective forms an image of the sample an infinite distance above the objective. This image then acts as an object for the tube lens, which forms a (typically) magnified image of the sample at a fixed location in space. As one skilled in the art would readily understand, though, the disclosure applies equally to the case where the focal point is above the sample surface, and an image of the surface is formed a finite distance above the objective without the use of a tube lens. Thus, while the "infinite conjugates" imaging condition is used here to simplify the description of the invention, the description can be generalized with no loss of accuracy to the "finite conjugates" imaging condition. It can also be applied to the case where the focal point is below the sample surface S.

Unfortunately, 1.5× and 2× objectives have a relatively long focal length that in practice is not suitable for the same solution. For example, the distance D for Wyko 1.5× and 2.0× objectives is about 115 mm, about 64 mm too long for fitting within the nominal parfocal distance D' of 51.35 mm used for the more powerful, and shorter, objectives. Thus, it is clear that low-power objectives could not be mounted parfocally on a turret alongside more powerful objectives. If sufficient space were provided to mount both, focussing a "short" objective would cause an adjacent "long" objective on the turret to physically contact the test sample or the microscope stage. The same could happen while rotating the turret to place the long objective in operation. It is noted that for the purpose of this disclosure "low-power" objectives are considered to be those with magnifications of 1.5× and 2×, while "high-power" objectives are those with magnifications of 2.5× to 50×. Although these definitions do not correspond to normal microscopy usage, where high power typically would refer to magnifications somewhat greater than 2.5×, they are appropriate for the description of the invention, which regards the physical length of the objectives in relation to their power of magnification.

Several practical difficulties prevent the design of a turret/microscope assembly with sufficient height D' to accommodate all objectives of interest in a substantially parfocal condition (that is, theoretically, very tall collars 22 could be used with high-power objectives to obtain the same nominal parfocal distance D' for all objectives). One problem with this approach is that degraded illumination would result for the more powerful objectives due to a substantial misalignment along the optical axis of their entrance pupils with respect to the less powerful objectives. This misalignment of the entrance pupils would also cause the light beam to pass through different portions of the collection optics for the high-power versus the low-power objectives. In addition, the telecentricity of microscope objectives, which prevents changes in magnification during focussing, makes it difficult to substantially shorten the length of the low-power objective in a practical and economically feasible manner. Finally, the problem is further complicated by the fact that interference objectives require a beamsplitter in the optical path. Since Michelson interferometers, which employ a cube beamsplitter placed between the last lens and the test object, are most suitable for low-magnification objectives, the additional space occupied by the beamsplitter further decreases the length available for placement of the other optical components of the objectives while maintaining a given parfocal length.

Accordingly, there is still a need for a low-power interference objective that is substantially commensurate in length with higher-power objectives for concurrent use mounted in parallel on a rotatable turret. This invention is directed at providing a novel approach to that end.

BRIEF SUMMARY OF THE INVENTION

One primary goal of this invention is a design of interference microscope objectives suitable for mounting on a rotatable turret in parfocal condition, such that minimal focussing is required when switching from one objective to another.

Another objective of the invention is the design of 1.5× and 2× interference microscope objectives that have substantially the same mechanical length as higher-power objectives (such as 2.5× to 50× magnification) having a tube lens with a common reference focal length.

Another important goal of the invention is a solution that provides substantially uniform illumination with all objectives mounted on the turret.

Still another objective is a solution that is practically feasible even accounting for the space occupied by the beamsplitter required for the interference portion of the objective.

Another object of the invention is an approach that is particularly suitable for implementation in a Michelson interferometric arrangement.

Finally, a goal of the invention is the development of a method and apparatus that are suitable for implementation with relatively minor modifications to existing interference microscope objectives and interferometric surface profilers.

Therefore, according to these and other objectives, the invention consists of folding the light beam to the side of the optical axis of the objective, thereby maintaining the original optical path length while shortening the mechanical length of the objective. The beam is reflected by a mirror, causing it to travel some distance out to the side, and then it is reflected back toward the beamsplitter by an additional pair of mirrors. After a final reflection within the beamsplitter, the resulting beam is coaxial with the original optical axis, while the physical length of the objective has been substantially reduced. This approach makes it possible to obtain the desired distance from the mounting shoulder of the objective to the focal point.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Although folding beams have been utilized for various purposes in the optical arts, for example in binoculars, the heart of this invention lies in the recognition that the technique of folding a beam can be used advantageously to make a low-power microscope objective parfocal with other objectives. This approach provides a simple solution to a yet unresolved problem and constitutes a useful advance in the art of microscopy in general and interferometric profilometry in particular.

Figure 1:
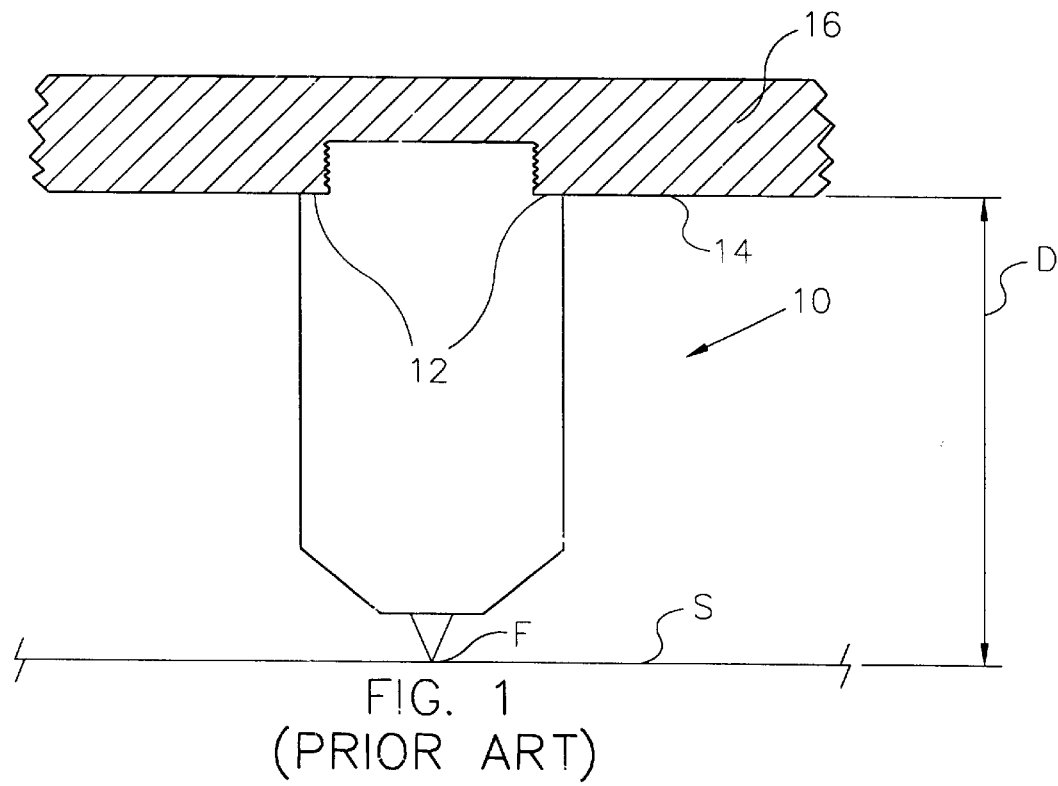
FIG. 1 is a simplified schematic representation of a conventional interference microscope objective mounted on a turret to illustrate the fixed distance between its mounting shoulder and the objective's focal point.
Figure 2:
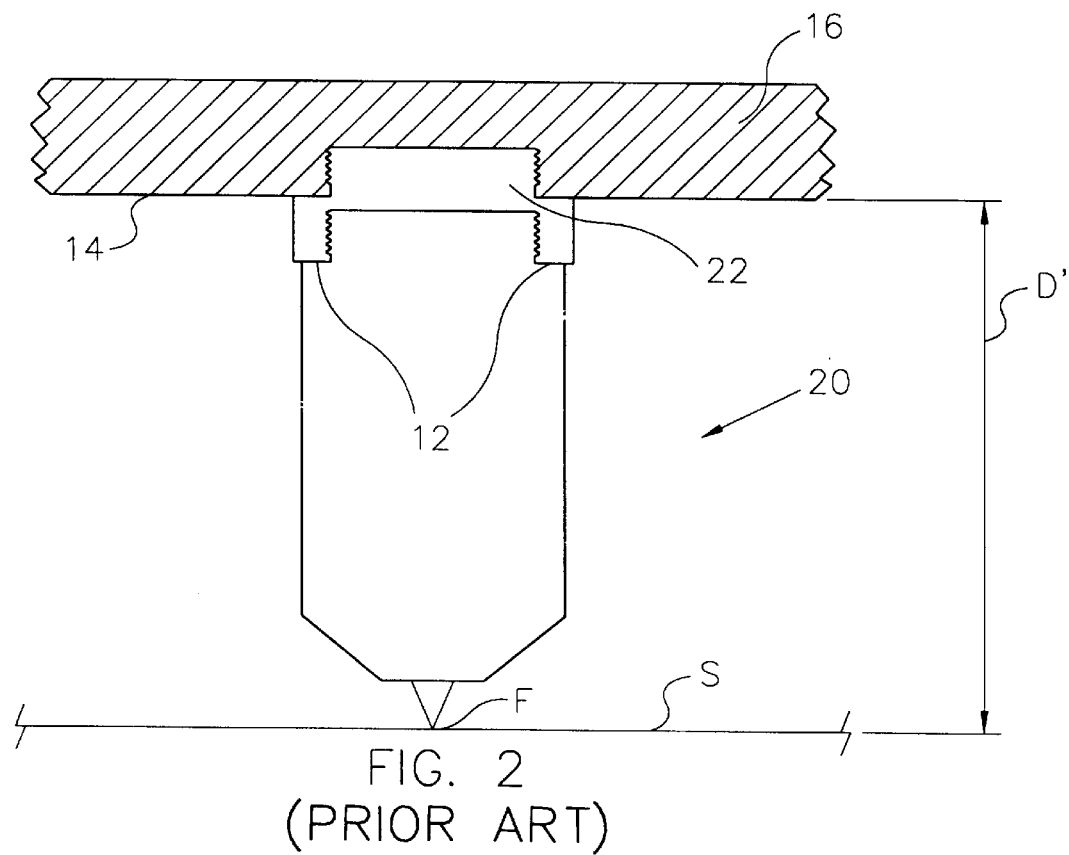
FIG. 2 is a schematic representation of a microscope objective mounted on a turret by means of an extension collar to obtain parfocal conditions at a predetermined distance between the turret's mounting plane and the objective's focal point.
Figure 3:
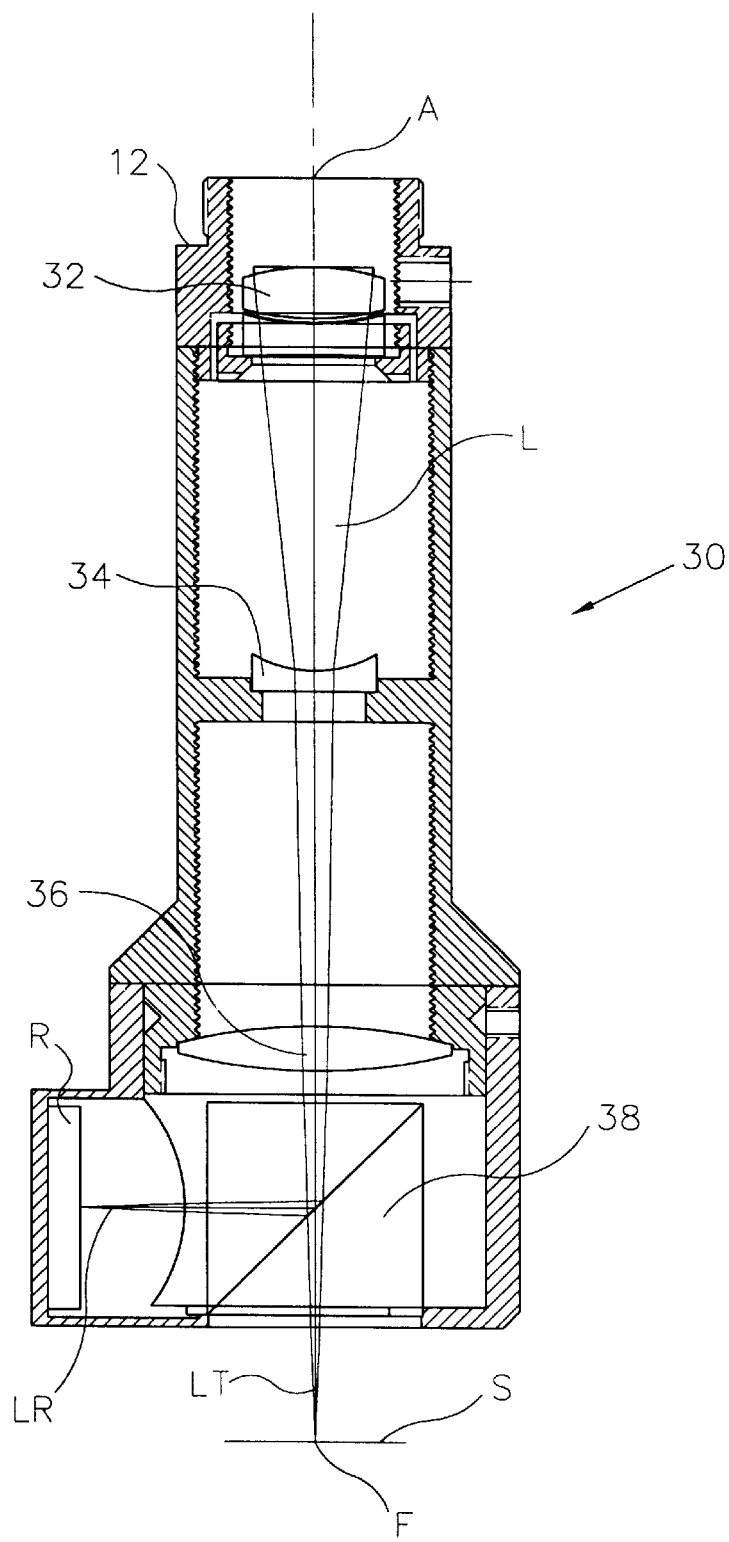
FIG. 3 is a simplified schematic representation of a conventional, 1.5× magnification, interference microscope objective to illustrate its long physical structure with an optical path that is coaxial with the optical axis of the objective.

As illustrated in schematic form in FIG. 3, a typical low-power (1.5× and 2×) interference microscope objective 30 comprises a first optical member 32 downstream of a light source (not shown), followed by second and third optical members 34 and 36, respectively, through which the light beam L is passed toward a test surface S. A beamsplitter 38 reflects a portion of the light sideways in the direction of a reference surface R. The reference beam LR is focused on the surface of the reference surface R, while the test beam LT is focused on the test or sample surface S. The beams reflected from the reference mirror R and the test surface S pass back up through the optics of the objective and upward to a solid-state detector array (not shown), where interference fringes are produced as a result of the optical path difference between the path from the beamsplitter 38 to reference mirror R and the path from the beamsplitter to the test surface S. The detector array may be replaced by an eyepiece for manual viewing.

Figure 4:
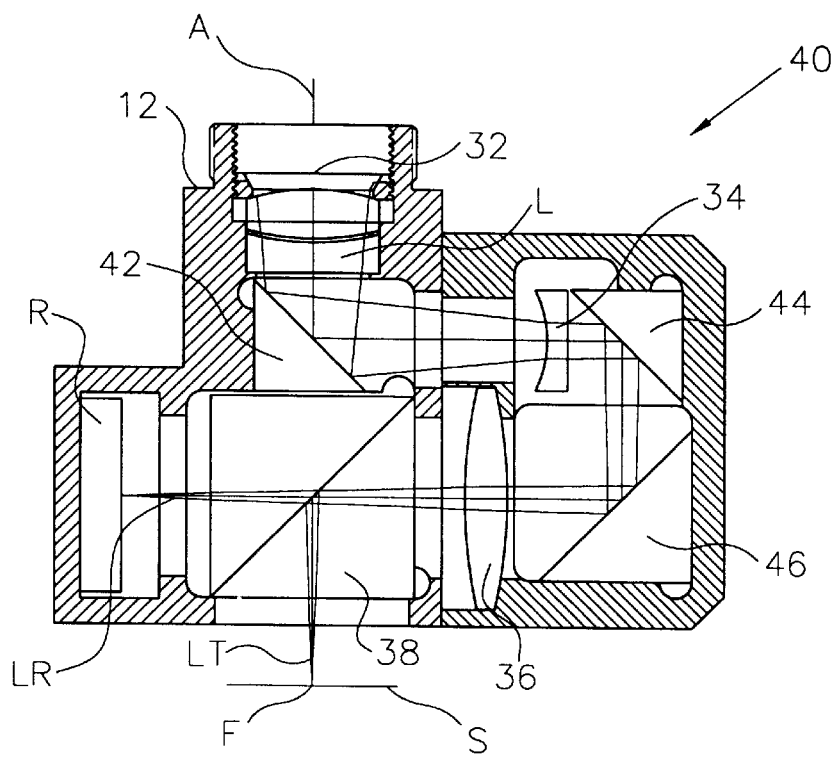
FIG. 4 is a simplified schematic representation of a 1.5×-magnification interference microscope objective according to the present invention, wherein its physical structure is substantially shortened and its optical path is folded outside the optical axis of the objective.

An interference microscope objective 40 according to the invention is illustrated in FIG. 4. Taking the objective 30 of FIG. 3 as an example, the idea is to produce a physically shorter interference microscope objective with the same optical characteristics of the original objective. A reflective surface 42 is positioned between the first optical member 32 and the second optical member 34 to fold the light beam L to the side of the optical axis A in a direction opposite and normal to the plane of the reference mirror R. The second optical member 34 in turn is positioned along the folded beam at the same optical distance from the first optical member 32 as in the original objective. The beam is then folded twice by two reflective surfaces 44 and 46, each disposed sequentially at a 45° angle to the incident light to direct the beam toward the beamsplitter 38 through the third optical member 36. The beamsplitter 38 is positioned with respect to the incident beam such that a portion of the light (the reference beam LR) is passed through to reach the reference surface S and another portion (the test beam LT) is reflected and directed along the optical axis A toward the test surface S.

Figure 5:
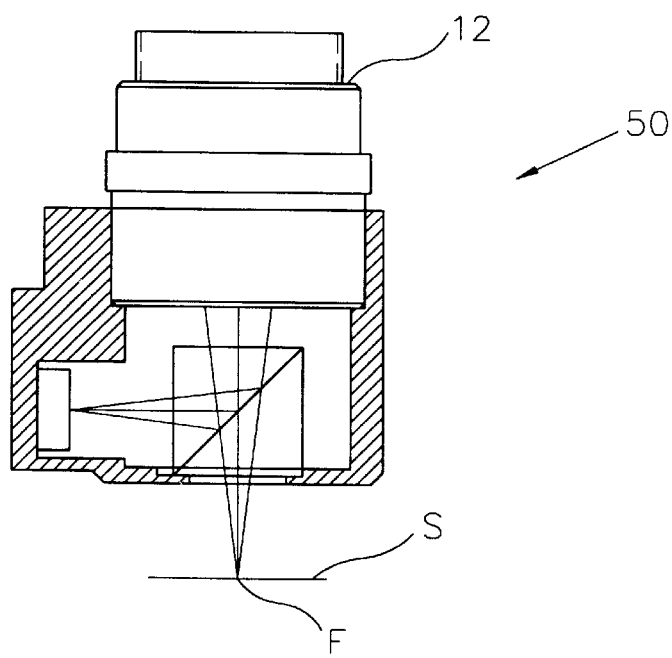
FIG. 5 is a simplified schematic representation of a conventional, 5× magnification, interference microscope objective having substantially the same physical length of the 1.5×-magnification objective of the invention, thereby providing a parfocal pair for mounting on an interference microscope turret.

Obviously, so long as the optical distances between the various optical components are maintained, the optical characteristics of such a physically shortened objective remain unchanged. Thus, the physical length of a low-magnification objective can be shortened to match a desired distance between the objective's mounting shoulder 12 and its focal point P in order to enable a parfocal design of a plurality of objectives with great variation in magnification. A substantially parfocal 5×-magnification objective 50, with the same tube-lens reference focal length as the shortened 1.5×-magnification objective 40, is shown in FIG. 5 for comparison.

While the presence of the beamsplitter in low-power interferometric microscope objectives is one of the key motivators for this invention, the technique outlined here is applicable to non-interferometric objectives as well. This can be seen in the design of a 1×, 0.5×, or even lower power objectives with a fixed parfocal length. In general, the difficulty of such a design increases with the ratio of the focal length to the parfocal length. For a sufficiently low power objective, this invention provides a means for simultaneously obtaining the required focal and parfocal lengths.

There is an additional benefit obtained with substantially parfocal and parcentric objectives, independent of the use of a turret. Parcentricity is defined as the property of having a common optical axis among objectives. This results in a sample in the center of the field-of-view in one objective being in the center of the field-of-view in the other objectives, and is independent of the parfocality. This benefit is realized in the case where the tip/tilt adjustment (important in interference microscopy) is obtained by adjusting the orientation of the light source, illumination and collection optics, turret, scanning mechanism, and camera all together rather than the case where these elements are fixed and the sample stage is adjusted. In such case, adjustment of the tip/tilt setting will change only the observed slope of the sample. This is in contrast to the case of non-parfocal objectives, where the tip/tilt can be ideal for only a single parfocal length, and tip/tilt adjustment will be accompanied by an effective translation of the sample when viewed with objectives of different parfocal lengths. This will be the case whether the objectives are mounted together on a turret, or mounted singly onto the system.

As one skilled in the art would readily recognize, the invention has been described in terms of three optical members because such would be the nature of the optics found in a conventional low-magnification telecentric microscope objective, but the concept of the invention is applicable to any combination of optical members so long as the optical distances between them are maintained in the folded beam. Similarly, each optical member may comprise one or more lenses, as necessary to achieve the desired optical behavior. The invention has also been described in terms of three reflective surfaces because they represent one way to fold a light beam to the side and back toward the reference surface. On the other hand, other arrangements, possibly involving fewer or more reflective surfaces, could also be used. It is understood that a reflective surface could be a conventional front-surface mirror disposed at an angle with respect to the beam, a right-angle prism, a total internal reflection prism, or any other optical device used to reflect light. Further, the angle through which the beam is deviated by the reflective surfaces may or may not be 90 degrees, as illustrated in this disclosure. It is also possible for the beam to travel in more than one plane, rather than the single plane employed here; that is, there need not be a common meridional plane among the reflective surfaces. Finally, the invention is particularly directed to interference microscopy, but it is clear that it could be applied advantageously to conventional (non-interferometric) microscope objectives as well.

Various other changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any an all equivalent processes and products.

I claim:

1. In an interferometric device comprising a movable objective turret adapted to receive a plurality of interference microscope objectives mounted in parfocal arrangement with respect to a sample stage, wherein a light beam is alternatively passed through any one of the objectives toward the sample stage to perform interferometric measurements on a sample surface, an interference microscope objective that comprises:
   (a) an objective housing adapted for mounting on the turret with an optical axis in substantial alignment with the light beam;
   (b) a plurality of optical members mounted within said housing at predetermined optical distances along an optical path toward the sample stage;
   (c) a reference surface disposed at a predetermined angle with respect to said optical axis;
   (d) first means for folding the light beam to a first direction away from said optical axis;
   (e) second means for folding the light beam from said first direction to a second direction toward said reference surface; and
   (f) means for splitting the light beam traveling in said second direction into a reference beam directed toward the reference surface and a test beam directed toward the sample stage.

2. The microscope objective of claim 1, wherein said first and second means for folding the light beam are reflective means.

3. The microscope objective of claim 1, wherein said reference surface is disposed substantially at a right angle with respect to said optical axis.

4. The microscope objective of claim 2, wherein said first means consists of a right-angle prism.

5. The microscope objective of claim 2, wherein said second means consists of a pair of right-angle prisms.

6. The microscope objective of claim 3, wherein said first reflective means consists of a right-angle prism.

7. The microscope objective of claim 6, wherein said second reflective means consists of a pair of right-angle prisms.

8. The microscope objective of claim 7, wherein said test beam is aligned with said optical axis.

9. The microscope objective of claim 2, wherein said plurality of optical members consists of first, second and third optical members; said first reflective means is positioned between the first and second optical members; and said second reflective means is positioned between the second and third optical members.

10. The microscope objective of claim 9, wherein said reference surface is disposed substantially at a right angle with respect to said optical axis.

11. The microscope objective of claim 10, wherein said first reflective means consists of a right-angle prism.

12. The microscope objective of claim 11, wherein said second reflective means consists of a pair of right-angle prisms.

13. An interference microscope objective having an optical axis substantially perpendicular to a plane containing a test surface, comprising:
- a beamsplitter producing a reference beam directed to a reference surface and a test beam directed to the test surface;
- a plurality of optical members disposed at predetermined optical distances along an optical path to the beamsplitter;
- first means for folding a light beam traveling in said optical path to a first direction away from said optical axis; and
- second means for folding the light beam to a second direction toward said beamsplitter.

14. The objective of claim 13, wherein said plurality of optical members consists of first, second and third optical members; said first means is positioned between the first and second optical members; and said second means is positioned between the second and third optical members.

15. The objective of claim 14, wherein said first means consists of a reflective surface folding the light beam at a 90-degree angle, and said second means consists of a pair of reflective surfaces each folding the light beam at a 90-degree angle.

16. The objective of claim 14, wherein said test beam is substantially coaxial with said optical axis.

17. An interferometric device comprising;
- an objective turret movable between alternative positions;
- a plurality of interference microscope objectives, each including an objective housing mounted on the objective turret;
- means for alternatively passing a light beam through any one of the interference microscope objectives along an optical axis thereof toward a sample stage to perform interferometric measurements on a sample surface; and
- a reference surface disposed at a predetermined angle with respect to said optical axis;
- wherein at least one of said interference microscope objectives comprises
  - (a) a plurality of optical members mounted within the housing at predetermined optical distances along an optical path toward the sample stage;
  - (b) first means for folding the light beam to a first direction away from said optical axis;
  - (c) second means for folding the light beam from said first direction to a second direction toward said reference surface; and
  - (d) means for splitting the light beam traveling in said second direction into a reference beam directed toward the reference surface and a test beam directed toward the sample stage;

such that said plurality of interference microscope objectives is in parfocal arrangement with respect to the sample stage.

18. The interferometric device of claim 17, wherein said first and second means for folding the light beam are reflective means.

19. The interferometric device of claim 17, wherein said reference surface is disposed substantially at a right angle with respect to said optical axis.

20. A method for achieving parfocal conditions between a first interference microscope objective and a second interference microscope objective of substantially greater magnification power in an interferometric device, comprising the following steps:
- (a) providing a movable objective turret adapted to receive said objectives in alignment with an optical axis substantially perpendicular to a test surface;
- (b) providing a plurality of optical members in said first objective, said members being disposed at predetermined optical distances along an optical path to a beamsplitter adapted to produce a reference beam directed to a reference surface and a test beam directed to the test surface;
- (c) folding a light beam traveling in said optical path to a first direction away from said optical axis;
- (d) folding the light beam from said first direction to a second direction toward said optical axis; and
- (e) folding the light beam from said second direction to a third direction substantially parallel to said optical axis;
- wherein said folding steps are carried out along said optical path to the beamsplitter such that the first interference microscope objective achieves a substantially parfocal relation with respect to the second interference microscope.

21. The method of claim 20, wherein said plurality of optical members consists of first, second and third optical members; said step (c) is carried out by folding the light beam between the first and second optical members; said step (d) is carried out by folding the light beam between the second and third optical members; and said step (e) is carried out by folding the light beam in the beamsplitter.

22. The method of claim 21, wherein said step (c) is carried out with a reflective surface folding the light beam at a right angle, and said step (d) is carried out with a pair of reflective surfaces each folding the light beam at a right angle.

23. The method of claim 22, wherein said third direction is substantially coaxial with said optical axis.

* * * * *